Oct. 25, 1955 A. A. ENSMINGER Re. 24,077

STORM SASH

Original Filed Aug. 4, 1938 2 Sheets-Sheet 1

INVENTOR
Arthur A. Ensminger
BY
Evans & McCoy
ATTORNEYS

STORM SASH

Original Filed Aug. 4, 1938 2 Sheets-Sheet 2

INVENTOR
Arthur A. Ensminger
BY
Evans & Meloy
ATTORNEYS

United States Patent Office

Re. 24,077
Reissued Oct. 25, 1955

24,077

STORM SASH

Arthur A. Ensminger, Oakland Park, Fla., assignor by mesne assignments, to The F. C. Russell Company, Cleveland, Ohio, a corporation of Ohio Original No. 2,262,670, dated November 11, 1941, Serial No. 223,068, August 4, 1938. Application for reissue January 12, 1953, Serial No. 330,934

6 Claims. (Cl. 189—64)

Matter enclosed in heavy brackets [ ] appears in the original patent but forms no part of this reissue specification; matter printed in italics indicates the additions made by reissue.

This invention relates to combination storm and screen sashes and more particularly to an adjustable all-year sash with seasonably interchangeable panels.

An object of the present invention is to improve the combination storm and screen sash that is disclosed in my issued Patent 2,013,824, dated September 10, 1935.

Another object is to provide a sash that is adapted for fitting snugly into building apertures that are not of accurate dimensions and that have become slightly deformed or out of true from the settling of the building and the weathering, warping, and the like, of the wood of which the aperture casing is made.

A further object is to provide an adjustable seal that makes sliding engagement with the frame of an article in an aperture and that may be drawn tightly against both the aperture casing and the frame of the article that is mounted in the aperture casing to form a wind arresting storm seal with both.

Another object is to provide a sash frame that contains a thermally insulating normally dead air space substantially throughout its length.

Another object is to provide a storm sash installation for windows and the like that minimizes the decay of the window sill by minimizing the retention of water therebetween and the development of condensation on the inner side.

Another object is to provide a glass panel wherein the glass is protected from strain, and where preferred, a panel wherein the glass may be simply and easily replaced when broken.

A further object is to provide a glass panel deflector packing that deflects the water and the rubber blade of a window cleaning tool past the junction of the glass with the packing, and that may protectingly cover adjoining parts where desired.

A further object is to provide an improved panel keeper that may both lift and fasten a sash in the frame.

Another object is to provide a seal that is adjustable on an article frame both toward and away from the article and, if desired, longitudinally of the seal.

Another object is to provide a simply constructed screen frame that has butt welded corners.

Other objects are to provide a sash assembly that embodies various refinements and modifications that have been found by experience to be of practical advantage in both manufacturing and to the trade.

With the above and other objects in view that will be apparent to those who are familiar with the art to which the present invention pertains, illustrative embodiments of the invention are disclosed in the accompanying drawings, wherein:

[Fig. 17 is an indoor elevation of an insulated modified sash assembly;]

[Fig. 18 is a side elevation of the sash that is shown in Fig. 17;]

[Fig. 19 is an enlarged section of the top cross bar of the sash frame, taken along the line 19—19 of Fig. 17;]

[Fig. 20 is a plan view of a glass panel that may be removably installed in a sash frame;]

[Fig. 21 is an enlarged section of the bottom cross bar of the sash frame, taken along the line 21—21 of Fig. 17;]

[Fig. 22 is an enlarged section of one of the sash frame side bars and panel keeper, taken along the line 22—22 of Fig. 17;]

[Fig. 23 is a view, partly in section, of the panel keeper that is shown in Fig. 22;]

[Fig. 24 is an enlarged section of the middle bar of the sash frame, taken along the line 24—24 of Fig. 17;]

[Fig. 25 is an enlarged section of a modified middle bar for a sash frame;]

[Fig. 26 is an enlarged broken away outdoor elevation of an upper corner of the sash frame that is shown in Fig. 17; and]

[Fig. 27 is an enlarged broken away outdoor elevation of a lower corner of the sash frame that is shown in Fig. 17.]

The combination storm and screen sash assembly that embodies an illustrative part of the present invention, comprises a sash frame that is made up of a pair of hollow side members 1, a top cross bar 2, a middle cross bar 3, and a bottom cross bar 4, that are secured together at their junctions in any appropriate manner, as by welding, rivets, or the like.

Figure 13:
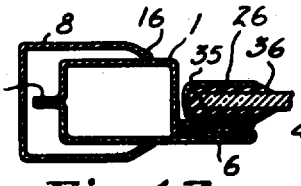
Fig. 13 is a section of a sash side portion of the frame, sliding seal, and panel assembly that shows a glass panel that has a deflector frame construction.
Figure 10:
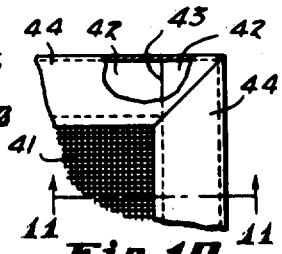
Fig. 10 is an enlarged view of a corner of a removable screen panel.

The individual sash frame members, including the cross bar portions, are preferably hollow and are made of shaped, suitable sheet material that may have its edges secured together in any desired manner, as by welding or the like, and that may have a weld strip portion 5 forming a part thereof, if desired. Where the weld strip structure is adopted, the weld strip may occupy an edge, or it may be disposed between the edges, as shown in Fig. 13, or it may occupy other suitable or advantageous location on the particular sash frame member.

Suitable outdoor panel receiving flanges form a part of the various sash frame members, such as the side member outdoor flanges 6.

Figure 14:
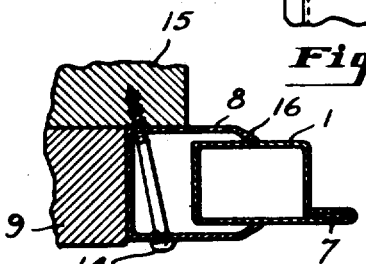
Fig. 14 is a section of an installed sash frame side member that is secured together along its panel supporting flange.

The sash frame member that is shown in Fig. 14 is formed from a single strip of material and, if welded together at all, may be welded along its panel receiving outdoor flange 7.

The sash frame is mounted in a building aperture with preferably a sliding seal in adjustably secured contact with the sash frame.

Figure 2:
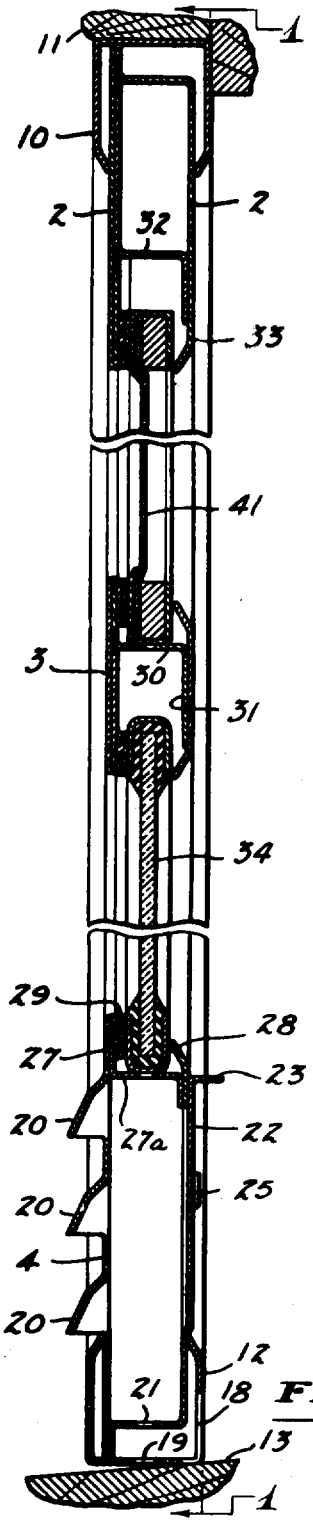
Fig. 2 is an enlarged fragmentary section taken along the line 2—2 of Fig. 1.
Figure 1:
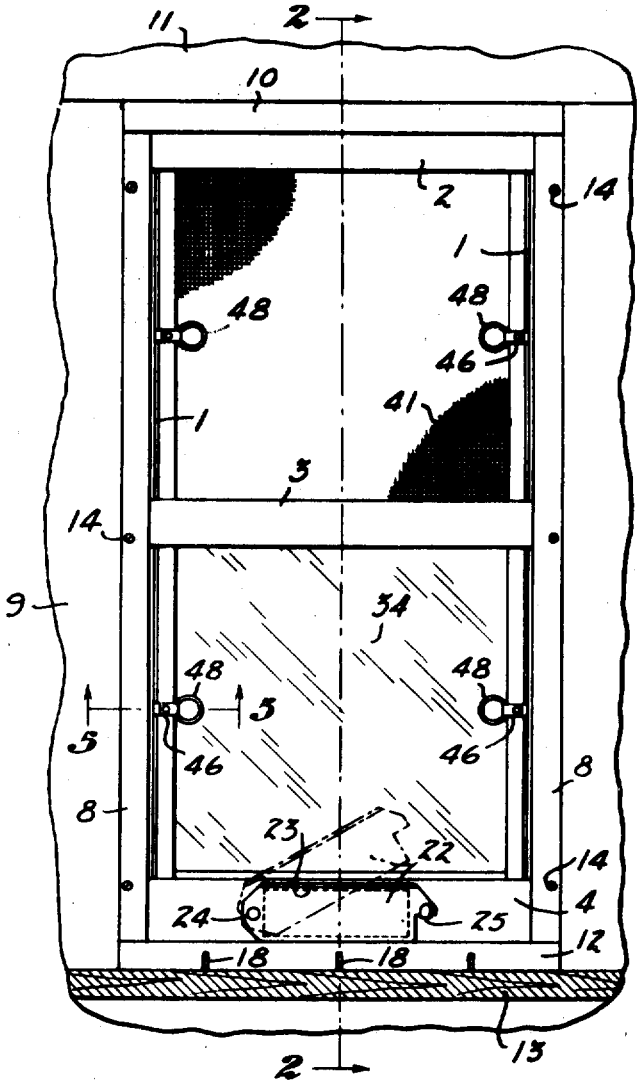
Fig. 1 is an elevation from indoors of a combination storm and screen sash mounted in a building aperture; *portions of the walls of the building aperture and the mounting screws being omitted or shown in section as indicated by the line 1—1 in Fig. 2;*
Figure 3:
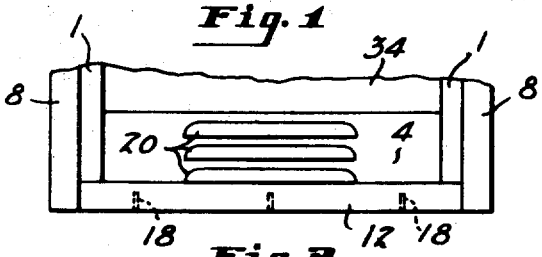
Fig. 3 is an elevation from outdoors of the [broken away] lower part of the sash [that is] shown in Fig. 1.
Figure 4:
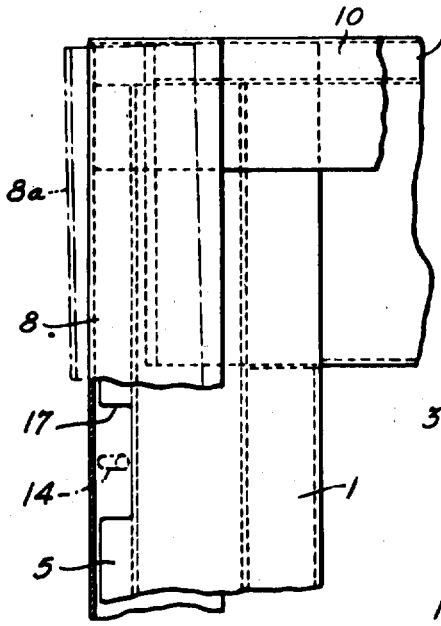
Fig. 4 is an enlarged elevation of a broken away corner of the sash frame with its adjustable sliding seal shown against the sash frame in full lines and adjusted away from the sash frame to completely fill the building aperture in which the sash is mounted in dot and dash lines.

In the structure shown, a pair of seal side members 8 closely abut the building aperture side casings 9, the sliding seal top member 10 abuts the head casing 11, and the sliding seal bottom member 12 rests on the sill 13. Each of these sliding seal members may be adjusted toward or away from a part of the sash frame, as shown in dot and dash lines 8a in Fig. 4, or longitudinal thereof, so that no objectionable crack appears between the seal and the building aperture casing.

Figure 5:
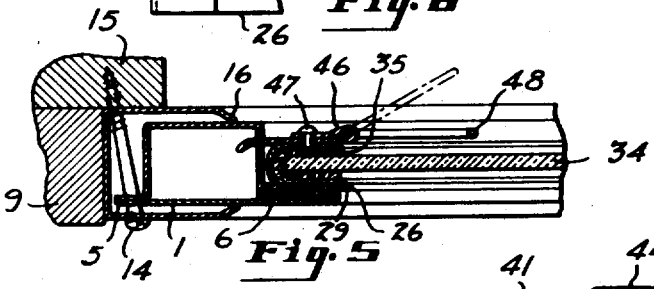
Fig. 5 is an enlarged section of the side frame, sliding seal, panel and keeper, taken along the line 5—5 of Fig. 1.
Figure 15:
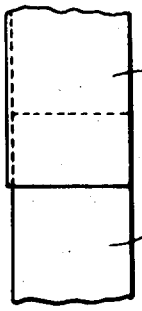
Fig. 15 is a multiple sectioned axially telescoping sash frame seal that permits a limited elongation or shortening adjustment as well as a lateral adjustment of the seal on the sash frame; *and*
Figure 7:
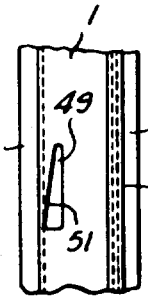
Fig. 7 is an enlarged elevation of the keeper engaging portion of the sash frame.
Figure 6:
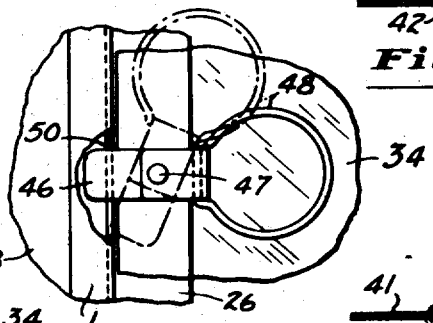
Fig. 6 is an enlarged view that is partly broken away, of the panel keeper that is shown in Fig. 5.
Figure 11:
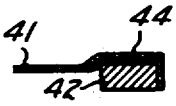
Fig. 11 is a screen panel section taken along the line 11—11 of Fig. 10.
Figure 12:
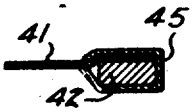
Fig. 12 is a section of a modified screen panel that has an enclosing surfaced frame.

The sliding seal shown in Fig. 5, is of substantially channel shape, with a plurality of side walls extending from a base portion. Where desired, the modified telescoping seal member that is shown in Fig. 15 may be used. In this structure the inner telescoping seal 85 slides longitudinally into the outer telescoping seal 86. The division is preferably substantially midway between the ends of the assembled seal.

The sliding seal members are secured in the building aperture at desired locations by suitable means, such as by the screws 14 that enter the building aperture blind stop 15 and that draw the sash frame contacting, preferably inclined, free edges 16 of the seal members into close clamping engagement with the contacted parts of the sash frame. The sash frame screw holes, it will be noted, are preferably, altho not necessarily, offset slightly with respect to each other so that the screws 14 have sufficient slant to draw the seal tightly against the casing of the building aperture. Where the mold strip structure is used, the weld strip 5 is cut away, as at 17, to provide ample clearance for the proper positioning of the screws.

The bottom seal member 12 has a desired number of drainage and breather apertures 18 in the indoor side thereof for permitting a limited air circulation through the sash. It also has a fluid drainage aperture 19 that is offset and not in alignment with the apertures 18 and which permits the escape of any wind-borne water or the like that is carried into the interior chamber of the hollow frame bottom bar 4 through the ventilation louvers 20 that are disposed in the outdoor side of the bottom bar 4, and that flows into the seal bottom member through the drain aperture 21 in the sash frame bottom bar 4.

Ample areas of the seal bottom member 12 and the sill 13 are preferably exposed to the drying action of air to minimize the retention of water therebetween. This end is accomplished in the disclosed structure by the edge engagement of the lower face of the seal bottom member 12 with the inclined sill 13.

The screws 14 are preferably drawn sufficiently tight so that the side members of the seal substantially support the bulk of the weight of the sash assembly to provide substantially a floating sash and to minimize the setting of the sash assembly on the building aperture sill. The weld strip 5 on the sash frame bottom bar 4 may, if desired, be disposed on the indoor side of the lower face of the frame bottom bar to shorten the moment arm in the force distribution of the weight from the sash assembly through the seal bottom member 12 to the sill 13.

Suitable means is provided for permitting the passage of air through the sash on pleasant winter days, such as the shutter 22 that is provided with the hand grip 23 and that is opened in any desired manner, as by causing its rotation on the pin 24. The stop 25, or the like, arrests the shutter 22 in its closed position.

The bottom cross bar 4 receives a panel frame, such as the frame 26 of the glass panel that is shown in the lower panel aperture, in a suitable upwardly opening channel, such as that formed by the outdoor panel receiving flange 27 and the indoor flange 28 that may be inclined or not, as preferred and the cross brace 27a that forms the base of the channel. Suitable sash frame packing 29 may be interposed between the panel frame and a part of the panel receiving channel, if desired.

The middle cross bar 3 of the sash frame has a downwardly opening channel of ample depth to permit the easy clearing of the bottom bar indoor flange 28 on the introduction of the panel into the lower panel aperture, as by positioning the brace member 40 above the middle of the cross bar, or by similar provision.

The middle cross bar lower flange portion of the indoor strip 31 is preferably, tho not necessarily, of sufficient length to support a panel in the lower panel aperture when the lower bar of the panel frame is seated in the upwardly opening channel of the bottom cross bar.

The middle cross bar has an upwardly opening panel frame receiving channel of which the brace 30, or similar panel supporting means, forms the base or bottom and the upper flange portions of the indoor strip 31 and of the outdoor portion of the middle cross bar 3 forms the sides.

The top cross bar 2 of the sash frame opens downwardly in a panel frame receiving channel of ample depth so that the bottom bar portion of the panel frame may clear the upper flange edge of the middle bar inside strip 31.

The top cross bar brace 32 imparts strength and firmness to the top bar by being positioned preferably rather low in the top bar and by being secured, as by a weld, or the like, to both the outdoor part of the top bar and to the indoor portion 33.

During the winter months glass panels are positioned in the panel receiving apertures in the panel frame. The glass panel frame 26 preferably extends along the periphery of the glass 34 to provide a uniform thickness for the edge of the panel and to permit the handling of the panel without danger of hand injury from an exposed glass edge.

A desired packing material 35 may be interposed between the glass and the frame, if preferred, as shown in Fig. 5. The packing material, if soft and resilient, prolongs the life of the glass by its absorption of shocks or torque to which the panel frame may be subjected.

Figure 16:
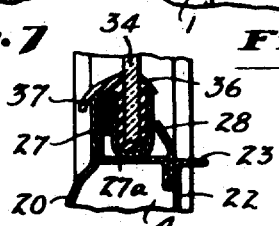
Fig. 16 is a section of an extended water deflecting lower edge of a glass panel, as applied to the bottom cross bar of the assembly that is shown in Fig. 2.

The packing 35 is shown in Figs. 13 and 16, as having the deflector portion 36 that extends along the glass beyond the frame and that imparts an attractively finished appearance to the panel. The deflector portion 36 simplifies the cleaning of the window panels by deflecting the water and the rubber strips of a window cleaning tool beyond the junction of the glass and the packing without the deposit of objectionable water at the edge of the glass.

The deflector portion 36 may also protectively overlie the edge of the glass panel frame and, if desired, extend continuously beyond the sash frame packing 29 and the edge of a sash frame panel receiving channel, as the strip 37 that is shown in Fig. 16, to protectively deflect the flow of water thereacross, where the packing 35 is of waterproof material, such as rubber or the like.

Figure 8:
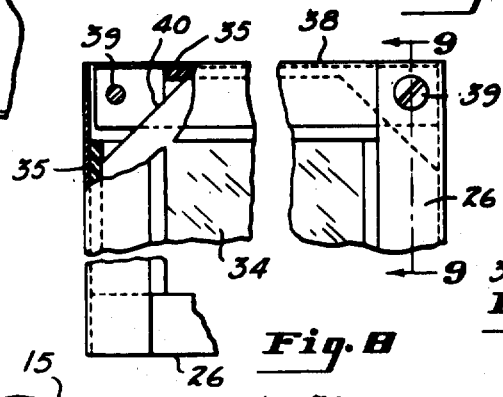
Fig. 8 is an enlarged fragmentary view of a glass panel of the type that has a screw securing removable portion in its frame for glass replacement.
Figure 9:
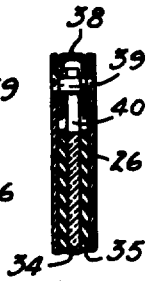
Fig. 9 is a section taken along the line 9—9 of Fig. 8.

The glass panel frame 26 is secured together at the corners in any suitable manner, as by having its overlapping parts welded together, as shown in the lower corner of Fig. 8, where the frame is of metal, or the like.

The glass panel frame may be adapted for the replacement of glass therein, if desired. In the structure that is shown in Fig. 8, one or more sections 38 of the frame, with its packing 35, may be removably secured to the remainder of the frame by suitable means, such as by the screws 39. A portion of the glass may be removed to provide clearance for the screw, as where the corner is cut away at 40, or the like.

During the summer months the glass panels are kept in storage and screening panels are in use in the sash.

The screen wire 41 in the screen panel is mounted on the screen frame in any suitable manner, as by having its edge secured by welding, or otherwise, where the core is of metal or the like, to the screen frame core 42, that may be solid bar stock, as shown, or hollow to decrease the weight of the panel, as preferred.

For the present use it has been found that ample strength is imparted to the corners of the screen panel where the core 42 is abutted and spot welded deeply at the line of abutment, as at 43, on the face and the outer edge of the core 42.

A finished appearance is imparted to the screen panel frame in any suitable manner, as where sheet material 44 is applied to overlie the contact between the screen wire 41 and the core 42, or where a desired sheet material 45 substantially incloses the frame core 42.

The panels are preferably secured in the panel receiving apertures of the sash frame by suitable means, such as the keepers 46, that are operatively interposed between the panel and the sash frame in any preferred manner.

In the illustrated structure shown, the keeper 46 is rotatably mounted on a panel frame by suitable means, such as by the rivet 47. The keeper is provided with a suitable hand operating means, such as the ring 48 that is advantageous in that it may be folded back against the sash frame so that it is not objectionably visible from the outdoor side of the sash.

The sash frame engaging end of the keeper contacts the sash frame in any desired manner to firmly secure the panel within the sash frame. In the structure shown, the sash frame is apertured, as at 49, for the reception of the sash frame engaging end of the keeper. The sash frame aperture may, if desired, terminate on a level with an edge of the keeper, as at 50, so that leverage is available to lift the panel up out of the channel in which the lower part of its frame rests, or to press the panel frame down into its channel, as desired.

Where desired, an edge 51 of the aperture in the sash frame may be inclined sufficiently so that, as the sash frame-engaging end of the keeper is operated against it, the panel frame is pressed toward and is secured closely against the sash frame packing 29.

[The modified storm sash and screen assembly that is shown in Figs. 17–27 inclusive of the drawings comprises a plurality of sash frame members that are preferably shaped from single strips of material. The sash frame comprises a pair of hollow side members 52 that are provided with outdoor panel supporting flanges 53 against which panels are removably positioned.]

[The top bar 54 of the sash frame comprises hollow portions above and below a partition element or strengthening brace 55. The outdoor flange 56 is spaced from the indoor flange 57 sufficiently so that the indoor flange may yieldingly permit the insertion of the frame of a removable panel therebetween.]

[The bottom cross bar 58 of the sash frame is hollow and terminates upwardly in a panel receiving channel 59. Provision for permitting ventilation through the bottom bar is made by suitable means such as the rain deflecting and air-admitting, downwardly opening louvers 60 in the outdoor face of the bottom bar, and a shutter 61 that is movable, as by being mounted on the pin 62 or the like, and that is operated by suitable means, such as the handle 63. A rest for the shutter in its closed position is provided, such as the stop 64.]

[A suitable, yielding sill sealing means, such as the spring metal strip 65, is disposed at the lower edge of the sash frame bottom cross bar, in any desired manner, as by being clamped between parts thereof as shown. It may be welded in place or not, as desired, and serves to substantially close the junction between the sash frame and the sill 13 on which the sash frame rests. Suitable apertures 66 in the bottom bar permit the draining away of any wind borne water that may enter the bottom cross bar thru the louvers 60.]

[The sash frame is adjustably mounted in the building aperture casing in a desired manner, as by being adjustably interposed between the blind stop 15 and a sealing strip 67 that is secured in place by suitable means, such as the screws 68. The sealing strip 67 is drawn into close pressing engagement against the frame of the sash and serves to close against the admission of wind, any crack that may exist between the sash frame and the building aperture side casings 9 or the head casing 11.]

[Where the building aperture is of a size that requires a plurality of removable sashes, a suitable middle cross bar is provided, such as the middle bar 69 that opens upwardly in a panel receiving groove or channel 70 having spaced wall elements one of which is inclined at an acute angle to the plane of the panel, as shown. The downwardly depending spring flange 71 is disposed on the indoor side of the middle bar and is spaced from the stiff outdoor part of the bar so that the upper edge of the removable panel may be inserted therebetween. The brace or partition element 72 extends across the middle bar 69 and assists in imparting rigidity thereto.]

[A modified middle cross bar 73 is shown in Fig. 25 of the drawings, wherein a double thickness of metal, as in the middle bar 69, forms the outdoor side of the bar and extends toward the indoor side thereof to provide the brace portion 74, from which it divides into the more resilient single thicknesses of metal and provides the upwardly and downwardly extending spring indoor panel gripping flanges 75. The upwardly and the downwardly opening channels that are so positioned yieldingly receive upper and lower panel frames thereinto.]

[The parts of the sash frame are preferably secured together by suitable overlap structures, such as those that are shown in Figs. 26 and 27 of the drawings, and may be welded, riveted, soldered, or otherwise fastened to impart rigidity to the frame.]

[The removable glass panels comprise the sheet of glass 76, that preferably has its edge protectively enclosed in a frame of suitable material, such as the metal 77 that may be replaced where desired, by rubber, a plastic, a fabric or the like, to minimize the breaking of the glass and to prevent cuts and injuries to the hands of anyone handling the panels, and also to insure a panel edge of uniform thickness thruout its length.]

[Suitable means may be used, if preferred, for rigidly securing the panels in the sash frame. The form of securing device that is shown in the Figs. 22 and 23, comprises a J-shaped keeper 78 that is made of metal or the like, and that is movably mounted on the panel frame 77 by suitable means, such as the rivet 79. The tip of the longer arm of the keeper 78 enters an aperture 80 in the side sash frame 52 to lock the panel in position. The aperture 80 in the side sash frame 52 preferably terminates in an upper edge that is substantially level with the upper edge of the keeper 78, so that by pressing down on the keeper handle 81 the bottom edge of the sash panel is pressed down into the groove into which it seats. The reverse action is accomplished where the keeper lower edge is level with the lower edge of the aperture 80.]

Removable panels are inserted and secured in the sash frame from preferably the inside of the building. The panels may be of sheet metal during such time as the building is unoccupied, glass for winter, and screen for summer.

The combination of the resiliently yielding top, bottom and side sealing members 8, 10 and 12 provides a supporting frame that may be used in window openings of considerable variation in size and shape and receive a standard size and shape of window assembly that is secured in place by the yielding pressure of the contacting edge portions of the sealing members. This edge contact is of sufficiently small area to minimize the heat transfer between the metal surfaces. The yielding contact removes all strain incident to expansion and contraction of the building or of the window parts from one another, so that there is no warping or objectionable strains imposed upon the window assembly. This floating or free moving action of the window assembly prevents the development of objectionable cracks or openings and maintains adequate seal between the window assembly and the window casing during all weather conditions.

The formation of the dead air spaces or cells, by reason of the hollow sheet metal construction of these parts, and the small area of contact between metal surfaces, minimizes the transfer of heat through the assembled unit. The dead air spaces or cells are so divided by the structural formation of the metal parts that there is a minimum circulation of air within the structure and a minimum replacement of the air confined within the structure.

The dead air space or air cell formed by the sealing members 8, 10 and 12 overlap the dead air space or cell formed within the window frame, the only contact between the metal in the side wall of the sealing members and the window frame being at the inner edge portions of the sealing members that engage the side wall of the sash frame.

For the purpose of further minimizing the transfer of heat and providing additional heat insulating properties to the structure, the metal parts are given an internal and external surface finish of a bright reflecting metallic paint or coating, such as aluminum paint, chrome plating or other radiant heat reflecting material.

It is to be understood that the particular constructions of sash frame members, seals and panels that are shown and described herein are presented for the purposes of illustration and explanation and that various modifications in the particular shapes, constructions and applications may be made without departing from the invention as defined by the appended claims.

What I claim is:

[1. A storm sash for mounting in a window aperture of a building comprising, a metallic panel receiving frame having rigidly connected side and transverse bars, side and transverse sealing members mounted on side and transverse bars of said frame for sealing the spaces between edges of the said panel receiving frame and the walls of a building aperture, each sealing member extending substantially the full length of the frame bar upon which it is mounted and being slidably mounted upon its frame bar for sidewise bodily movement and for tilting movements in the plane of said frame, each sealing member being adjustable independently of the others, whereby said sealing members are adapted to seat upon side and transverse walls of building apertures which vary in spacing and angularity, and means for securing said sealing members to the walls of the building aperture and for securing said panel receiving frame in fixed position with respect to the sealing members.]

[2. A storm sash for mounting in a window aperture of a building comprising, a metallic panel receiving frame having rigidly connected side and transverse bars, side and transverse sealing members mounted on side and transverse bars of said frame for sealing the spaces between edges of the said panel receiving frame and the walls of a building aperture, each sealing member being in the form of a channel bar and extending the full length of the frame bar on which it is mounted and having inwardly extending flanges slidably engaging opposite side faces of the frame bar, the side and transverse sealing members having slidably interfitting end portions and each sealing member being movable independently of the others in the plane of the panel receiving frame to seat upon side and transverse walls of a building aperture, and means for securing said sealing members to the walls of the building aperture and for clamping said panel receiving frame between the flanges of the sealing members.]

[3. A storm sash for mounting in a window aperture of a building comprising, a panel receiving frame having rigidly connected side and transverse hollow metal bars provided with flat inner and outer side faces, side and transverse sealing members mounted on side and transverse bars of said frame, each sealing member being formed of sheet metal and of channel shape, having a base portion adapted to engage a wall of a building aperture and resilient flanges having inturned edge portions slidably engaging the inner and outer flat faces of the frame bars, each sealing member extending the full length of the frame bar upon which it is mounted, one sealing member slidably receiving the end of another at corners of the frame, whereby the sealing members are independently adjustable sidewise and angularly in the plane of the panel receiving frame to seat upon the walls of a building aperture, and means for holding said sealing members in place against the walls of the window aperture and for applying a clamping pressure to the flanges of the sealing members to hold the panel receiving frame in fixed position with respect to the sealing members.]

[4. An auxiliary window for use with a permanent one, including an outer member attachable to the permanent window, said outer member being composed of sides and ends each of channel formation having their channels facing inwardly, the sides and ends being free of connection with each other to provide for adjustability in attachment and for expansion and contraction, a paneled inner member having sides and ends receivable in the channels of the outer member, the sides and ends of the inner member being disposed with free space between same and the corresponding sides and ends of the outer member, whereby to provide for tractability of the inner member relative to the outer member, and yieldable means to seal the outer portions of the channels against the ingress of air into the spaces aforesaid between the two members.]

[5. An auxiliary window in accordance with claim 4, wherein the inner member has slotted parts which extend toward the normal bottoms of the outer member, and wherein there are fastenings which extend through the sides of the outer member and through the slots of the slotted parts to simultaneously connect the members to the casing of the permanent window.]

[6. An auxiliary window in accordance with claim 4, wherein the inner member has reinforcing flanges which extend toward the normal bottoms of the outer member, and which flanges have slotted parts, and wherein there are fastenings which extend through the sides of the outer member and through the slots of the slotted parts to simultaneously connect the members to the casing of the permanent window.]

[7. An auxiliary window in accordance with claim 4, wherein the yieldable sealing means is provided by forming the free edge portions of the outer member with a part which projects inwardly at an angle toward, and frictionally contacts with, the adjacent portions of the inner member.]

[8. A building aperture sash, comprising in combination, a sash frame substantially rigid throughout its length, and a sash frame gripping seal that closely abuts the surface of the periphery of said building aperture and that is slidable both longitudinally of and toward and away from said sash frame in being mounted on said sash frame in adjustable tilting relation with the edge thereof.]

[9. A building aperture sash, comprising in combination, a sash frame for mounting in the casing forming the periphery of the building aperture, a three sided hollow seal having a pair of spaced edges in compressed adjustably tiltable engagement against opposite sides of said sash frame, and a screw entering said casing and having a head portion engaging one side of said seal and adjustably clamping both edges of said seal against said frame.]

[10. A structure of the character described for mounting across a building aperture comprising a panel receiving frame including rigidly connected side and transverse frame members, channel shaped sealing members embracing portions of the frame members and having spaced flanges slidable over opposite faces of the frame members for tilting and bodily movement of the sealing members relative to the frame members in adjusting the structure to apertures of different sizes and shapes, and means extending through the flanges of the sealing members for securing the structure in place and for drawing the flanges together to clamp the frame members therebetween.]

[11. A structure of the character described for mounting across a building aperture comprising a panel receiving frame including rigidly connected side and transverse frame members, channel shaped sealing members of thin metal embracing portions of the frame members and having spaced flanges slidable over opposite faces of the frame members for tilting and bodily movement of the sealing members relative to the frame members in adjusting the structure to apertures of different sizes and shapes, and means for drawing the flanges together to clamp the frame members therebetween and hold the structure in adjustment.]

[12. A structure of the character described for mounting across a building aperture comprising a panel receiving frame including rigidly connected side and transverse frame members having inside and outside faces, sealing members of channel form embracing portions of the frame members and engaging the faces thereof, said sealing members being individually slidable on the frame members for bodily movement relative to the frame members to embrace larger or smaller portions thereof and for tilting movement relative to the frame members in the plane of the latter, and means for securing the structure across a building aperture.]

[13. A structure of the character described for mounting across a building aperture comprising a panel receiving frame including rigidly connected side and transverse frame members, channel shaped sealing members of thin metal embracing portions of the frame members and having spaced flanges slidable over opposite faces of the frame members for tilting and bodily movement of the sealing members relative to the frame members in adjusting the structure to apertures of different sizes and shapes, and means for drawing the flanges together to clamp the frame members therebetween and hold the structure in adjustment, the marginal edge portion of one flange of each sealing member being bent toward the other flange thereof whereby said edges of thin metal are forced against and make line contacts with the frame members.]

*14. An auxiliary storm sash to be mounted in a window opening of a building, comprising side and transverse metal bars connected to form a rigid, rectangular frame for interchangeably receiving glass and screen panels, said frame having substantially flat inner and outer side faces, and side and transverse sealing members on the side and transverse bars of said frame for closely abutting the walls of the window opening and sealing the spaces between said walls and said frame, said sealing members being in the form of channels of resilient sheet metal extending substantially the full lengths of the frame bars on which they are mounted with the legs of the channels straddling and resiliently gripping the frame bars in sealing engagement with said flat inner and outer side faces thereof, said sealing members being adjustably slidable on said frame for sidewise, longitudinal, and tilting movement with respect thereto in the general plane thereof, a pair of said sealing members on opposite sides of said frame having apertures therein to receive fastening elements for permanently securing said pair of sealing members against the walls of the window opening, said apertures being disposed to locate said fastening elements in the region between said frame and the adjacent walls of the building opening and spaced from the frame to avoid interference with said sliding movement and provide for subsequent movement of said frame relative to the sealing members on at least three sides thereof with a self-adjusting seal.*

*15. An auxiliary storm sash to be mounted permanently in a window opening of a building, comprising side and transverse metal bars connected to form a rigid, rectangular, panel-receiving frame, said frame having substantially flat inner and outer side faces and including means for mounting glass and screen panels in the frame from the inner side thereof for ready removal and replacement, and side and transverse sealing members on the side and transverse bars of said frame for closely abutting the walls of the window opening and sealing the spaces between said walls and said frame, said sealing members being in the form of channels of resilient sheet metal extending substantially the full lengths of the frame bars on which they are mounted with the legs of the channels straddling and resiliently gripping the frame bars in sealing engagement with said flat inner and outer side faces thereof, and one sealing member slidably receiving the end of another at corners of said frame, whereby said sealing members are adjustably slidable on said frame for sidewise, longitudinal, and tilting movement with respect thereto in the general plane thereof, a pair of said sealing members on opposite sides of said frame having apertures therein to receive fastening elements for securing said pair of sealing members in permanent sealing engagement with the walls of the window opening, said apertures being disposed to locate said fastening elements in the region between said frame and the adjacent walls of the window opening and spaced from the frame to avoid interference with said sliding movement, whereby said frame may be floatingly mounted in non-uniform window openings with a self-adjusting seal on at least three sides thereof providing for subsequent expansion, contraction, and warping of the walls of the window opening in which it is mounted.*

*16. A storm sash for mounting permanently in a window aperture of a building, comprising a panel receiving frame having rigidly connected side and transverse hollow metal bars provided with flat inner and outer side faces, side and transverse sealing members mounted on side and transverse bars of said frame, each sealing member being formed of sheet metal and being of channel shape with a base portion adapted to engage a wall of a building aperture and resilient flanges having inturned edge portions slidably engaging the inner and outer flat faces of the frame bars, the sealing members extending entirely around the frame and one sealing member slidably receiving the end of another at corners of the frame, whereby the sealing members are independently adjustable longitudinally, sidewise, and angularly in the general plane of the frame to seat upon the walls of a building aperture, and means disposed beyond and spaced from the peripheral margin of said frame for holding said sealing members in place against the walls of a building aperture and providing for subsequent self-adjusting movement to accommodate expansion, contraction, and warping of the building aperture without imposing distorting strains on the frame.*

*17. A building aperture sash assembly comprising, in combination, a casing forming the periphery of a generally rectangular window opening for a building, a rigid, rectangular sash frame disposed in said opening, said sash frame comprising side and transverse metal bars connected together for interchangeably receiving glass and screen panels, a channel-shaped hollow seal for each of said side and transverse bars, each of said seals having three integral sides of resilient sheet metal, including a pair of spaced flanges straddling and gripping a frame bar*

*in resiliently compressed slidable engagement with opposite sides thereof for angular, longitudinal, and transverse adjusting movement with respect thereto in the general plane of said opening, and screws passing through at least one of the sides of an opposite pair of said channel-shaped seals and entering said casing for permanently firmly securing said pair of seals against said casing and securing said frame in said opening, the portions of said screws within a channel-shaped seal being confined to clearance spaces provided between the base of such seal and the adjacent edge of said frame and spaced from the frame to avoid interference with subsequent self-adjusting movement of the frame relative to the seals.*

*18. A building aperture sash assembly comprising, in combination, a casing forming the periphery of a generally rectangular window opening for a building, a rigid, rectangular, sash frame disposed in said opening, said sash frame comprising side and transverse metal bars connected together for interchangeably receiving glass and screen panels, a channel-shaped hollow seal for each of said side and transverse bars, each of said seals having three integral sides of resilient sheet metal, including a pair of spaced flanges straddling and gripping a frame bar in resiliently compressed slidable engagement with opposite sides thereof for angular, longitudinal, and transverse adjusting movement with respect thereto in the general plane of said opening, and screws permanently passing through said spaced flanges of an opposite pair of said seals and entering said casing for firmly securing said pair of seals against said casing and more firmly clamping both side flanges thereof against said frame, the portions of said screws passing between said spaced flanges of a seal being disposed between the base of such seal and the adjacent edge of the frame and spaced from the frame to avoid interference with subsequent self-adjusting movement of the frame relative to the seals.*

*19. An auxiliary window for use with a permanent one, including an outer member attachable to the permanent window, said outer member being composed of sides and ends each of channel formation having their channels facing inwardly, the sides and ends being free of connection with each other to provide for adjustability in attachment and for expansion and contraction, a paneled inner member having sides and ends receivable in the channels of the outer member, the sides and ends of the inner member being disposed with free space between same and the corresponding sides and ends of the outer member, whereby to provide for tractability of the inner member relative to the outer member, said inner member having outer edges that are relieved to form slots opening outwardly toward the channel bottoms of the outer member, fastening elements that extend through the sides of the outer member and through the slots of the inner member for permanently connecting the outer member to the casing of a permanent window, said slots being wide enough in directions parallel to said outer edges to receive said fastening elements with substantial clearance permitting subsequent shifting of the inner member with respect to the fastening elements in directions parallel to the slotted outer edges of the inner member, and yieldable means to seal the outer portions of the channels against the ingress of air into the spaces aforesaid between the two members.*

References Cited in the file of this patent or the original patent

UNITED STATES PATENTS

| | | |
|---|---|---|
| 377,991 | Connell | Feb. 14, 1888 |
| 514,654 | Higgin | Feb. 13, 1894 |
| 1,189,790 | Carroll | July 4, 1916 |
| 1,632,022 | Cook | June 14, 1927 |
| 1,767,116 | Brandes | June 24, 1930 |
| 1,793,536 | Abronski | Feb. 24, 1931 |
| 1,858,602 | Shrauger | May 17, 1932 |
| 1,911,752 | Dennis | May 30, 1933 |
| 2,156,964 | Biddle | May 2, 1939 |

OTHER REFERENCES

Catalogue entitled "Kingston Store Fronts," published in 1926 by Edward F. McHugh Co., Wilkes-Barre, Pa., page 6.